United States Patent

[11] 3,573,855

[72] Inventors Harvey G. Cragon
Dallas;
William J. Watson, Richardson, Tex.

[21] Appl. No. 788,166
[22] Filed Dec. 31, 1968
[45] Patented Apr. 6, 1971
[73] Assignee Texas Instruments Incorporated
Dallas, Tex.

[54] COMPUTER MEMORY PROTECTION
8 Claims, 4 Drawing Figs.

[52] U.S. Cl. .......... 340/172.5
[51] Int. Cl. .......... G06f 7/38
[50] Field of Search .......... 340/172.5; 235/157

[56] References Cited

UNITED STATES PATENTS

| | | | |
|---|---|---|---|
| 3,264,615 | 8/1966 | Case et al. | 340/172.5 |
| 3,328,768 | 6/1967 | Amdahl et al. | 340/172.5 |
| 3,340,539 | 9/1967 | Sims, Jr. | 340/172.5 |
| 3,377,624 | 4/1968 | Nelson et al. | 340/172.5 |
| 3,413,613 | 11/1968 | Bahrs et al. | 340/172.5 |

*Primary Examiner*—Paul J. Henon
*Assistant Examiner*—Harvey E. Springborn
*Attorneys*—Samuel M. Mims, Jr., James O. Dixon, Andrew M. Hassell, Harold Levine, Rene E. Grossman, Melvin Sharp and Richards, Harris and Hubbard

ABSTRACT: A data processing system is provided with a central processing unit with an arithmetic unit which is accessible to and from memory over buffered channels. The system is provided with registers for storage of upper and lower memory bounds for data to be read, data to be written and instructions to be fetched for execution. A comparison means is responsive to a request from memory for comparing each memory request with the bounds stored in the register file. The request from memory is enabled if the bounds comparison is satisfied, means being provided to elect internal or external bounds comparison.

INVENTORS:
HARVEY G. CRAGON
WILLIAM J. WATSON
Rene E. Grossman
ATTORNEY

INVENTORS
HARVEY G. CRAGON
WILLIAM J. WATSON
René E. Grossman
ATTORNEY

COMPUTER MEMORY PROTECTION

This invention relates to a digital computer wherein stored user program instructions of data to be read, data to be written and/or instructions to be fetched for execution are to be protected.

In a multiprogrammed computer it is often desirable to protect certain areas of memory in different ways. For example, it may be desirable to have one level of protection which prevents the entry of data into a certain region of memory; i.e., a memory write protection feature. Prior systems such as the Scientific Data Systems Sigma 7 includes such a feature of protection. In certain areas of computer applications it is desirable to have a section of memory protected such that the code contained within that section can only be executed and cannot be accessed by either reading or writing of data.

Electronic digital computer systems are now available which include elaborate memory systems with a central processor unit which operates in conjunction with a plurality of peripheral processors on a time sharing basis in order to take advantage of the high speed execution in the central processing unit.

The present invention relates to the control of access by the central processing unit to memory in response to a user program. Programs are written for the peripheral processor unit during development of a given computer and in general are well insulated by user programs. Thus the principal concern in the present invention is the protection of data and instructions as stored in memory and as requested by the central processing unit under the control of a user program.

More particularly, in accordance with the present invention independent memory bounds protection is provided for data to be read, data to be written and instructions to be fetched for execution. An upper bounds and lower bounds register pair store upper and lower memory addresses for each of read, write and execute memory storage addresses. Bounds comparators are provided with one commonly connected to each pair of the bounds registers. A source of memory request words is provided to supply ID code bits, memory address bits and accommodation for data bits to memory and to the comparators. Means including decode logic responsive to the ID code bits applies to enable the memory cycle if the address bits satisfy the comparator selected by the ID code bits.

In a further aspect of the invention means are provided to vary the response of each said comparator means from internal to external bounds comparison.

For a more complete understanding of the invention and for further objects and advantages thereof, reference may now be had to the following description taken in conjunction with the accompanying drawings in which.

In order to describe the present invention an advanced scientific computer system of which the present invention forms a part will first be described generally and then individual components and the role of the present invention and its interreaction with other components of the system will be explained. The computer is described and claimed in copending application, Ser. No. 744,190 filed Jul. 11, 1968 by Charles M. Stephenson and William J. Watson, the same being incorporated herein by reference.

Figure 1:
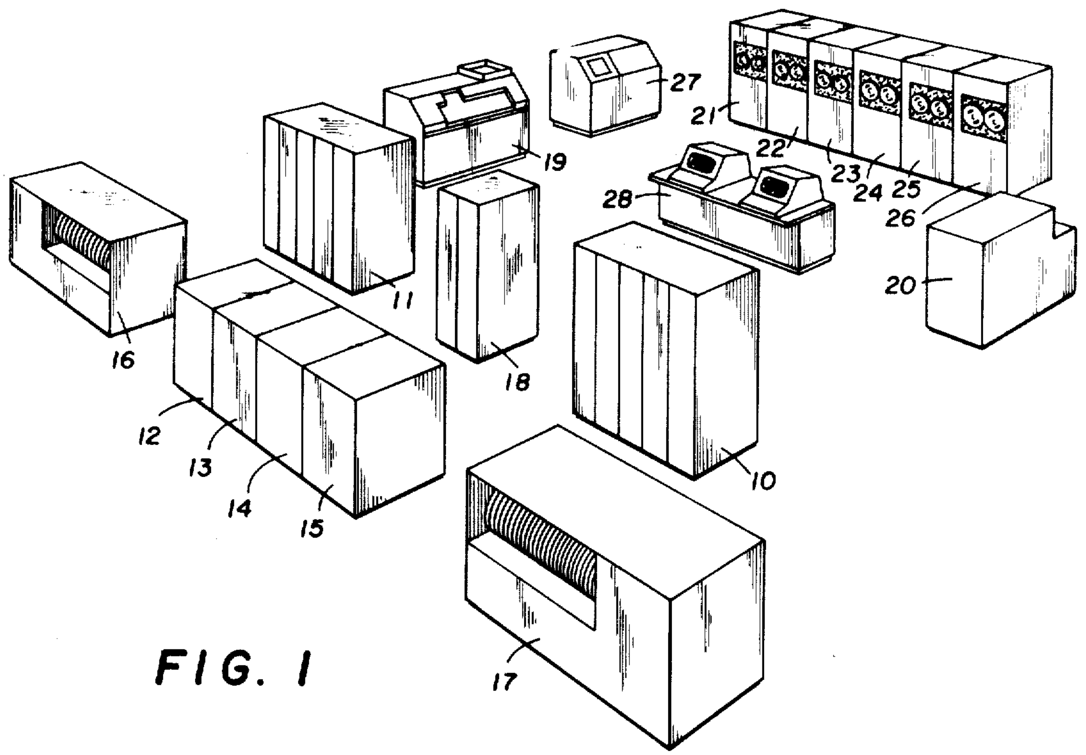
FIG. 1 illustrates an arrangement of computer components to which the present invention may apply.

Referring to FIG. 1, the computer system includes a central processing unit (CPU) 10 and a peripheral processing unit (PPU) 11. Memory is provided for both CPU 10 and PPU 11 in the form of four modules of thin film storage units 12—15. Such storage units may be of the type known in the art. In the form illustrated, each of the storage modules provides 16,384 words.

The memory provides for 160-nanosecond cycle time and on the average 100-nanosecond access time. Memory words of 256 bits each are divided into eight zones of 32 bits each. Thus, the memory words are stored in blocks of eight words in each of the 256 bit memory words, or 2,048 word groups per module.

In addition to storage modules 12—15, rapid access disc storage modules 16 and 17 are provided wherein the access time on the average is about 16 milliseconds.

A memory control unit 18 to which the invention primarily pertains is provided for control of memory operation, access and storage.

A card reader 19 and a card punch unit 20 are provided for input and output. In addition, tape units 21—26 are provided for input/output (I/O) purposes as well as storage. A line printer 27 is also provided for output service under the control of the PPU 11.

It is to be understood that the processor system thus has a memory or storage hierarchy of four levels. The most rapid access storage is in the CPU 10. The next most rapid access is in the thin film storage units 12—15. The next most available storage is the disc storage units 16 and 17. Finally, the tape units 21—26 complete the storage array.

A twin cathode ray tube (CRT) monitor console 28 is provided. The console 28 consists of two adapted CRT-keyboard terminal units which are operated by the PPU 11 as input/output devices. It can also be used through an operator to command the system for both hardware and software checkout purposes and to interact with the system in an operational sense, permitting the operator through the console 28 to interrupt a given program at a selected point for review of any operation, its progress or results, and then to determine the succeeding operation. Such operations may involve the further processing of the data or may direct the unit to undergo a transfer in order to operate on a different program or on different data.

Figure 2:
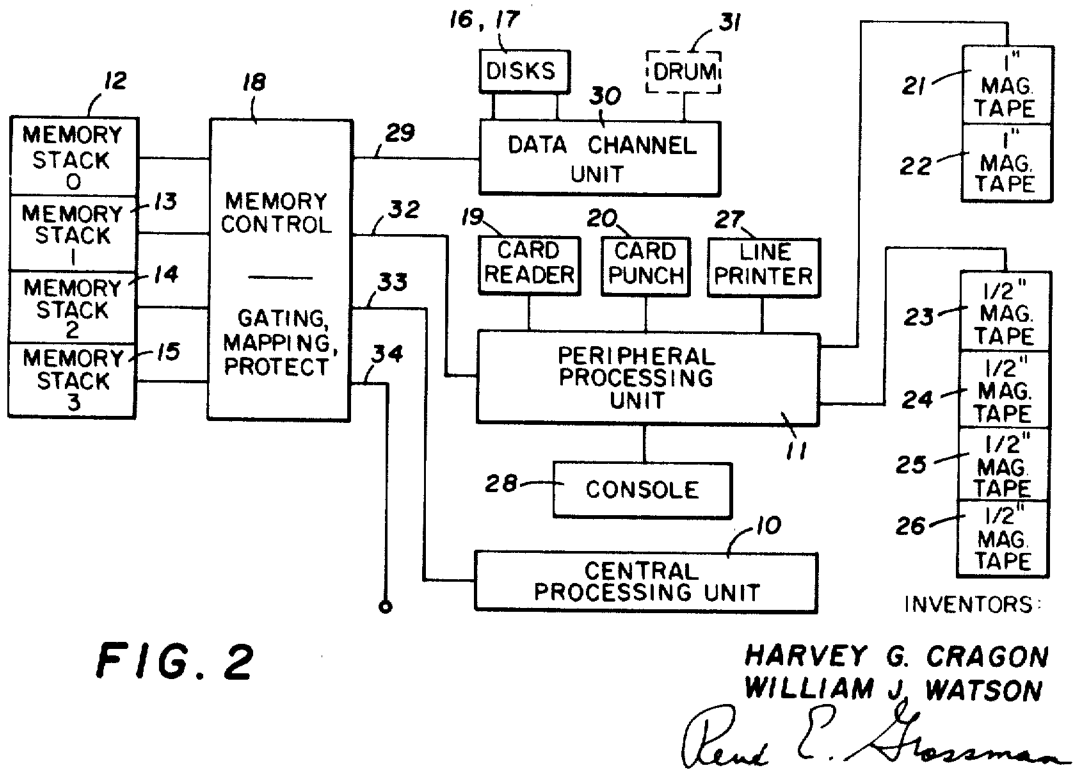
FIG. 2 is a block diagram of the system of FIG. 1.

There will now be described in a general way the organization of the computer system by reference to FIG. 2. Memory stacks 12—15 are controlled by the memory control 18 in order to input or output word data to and from the memory stacks. Memory control 18 provides gating, mapping, and, as will be detailed, protection of the data within the memory stacks as required.

A signal bus 29 extends between the memory control 18 and a buffered data channel unit 30 which is connected to the discs 16 and 17. The data channel unit 30 has for its sole function the support of the memory shown as discs 16 and 17 and is a simple wired program computer capable of moving data to and from memory discs 16 and 17. Upon command only, the data channel unit 30 may move memory data from the discs 16 and 17 via the bus 29 through the memory control 18 to the memory stacks 12—15.

Two bidirectional channels extend between the discs 16 and 17 and the data channel unit 30, one channel for each disc unit. For each unit, only one data word at a time is transmitted between that unit and the data channel unit 30. Data from the memory stacks 15—18 are transmitted to and from the data channel 30 in the memory control 18 in eight-word blocks.

A magnetic drum memory 31 (shown dotted), if provided, may be connected to the data channel unit 30 when it is desired to expand the memory capability of the computer system.

A single bus 32 connects the memory control 18 with the PPU 11. PPU 11 operates all I/O devices except the discs 16 and 17. Data from the memory stacks 12—15 are processed to and from the PPU 11 via the memory control 18 in eight-word blocks.

When read from memory, a read/restore operation is carried out in the memory stack. The eight words are "funneled down" with only one of the eight words being used within the PPU 11 at a time. Such "funneling down" of data words within the PPU 11 is desirable because of the relatively slow usage of data required by the PPU 11 and the I/O devices, as compared with the CPU 10. A typical available word transfer rate for an I/O device controlled by the PPU 11 is about 100 kilowords per second.

The PPU 11 contains eight virtual processors therein, the majority of which may be programmed to operate various ones of the I/O devices as required. The tape units 21 and 22 operate upon a 1-inch wide magnetic tape while the tape units 23—26 operate with ½inch magnetic tapes to enhance the capabilities of the system.

The virtual processors may be of the general type illustrated and described in U.S. Pat. No. 3,337,854 to Cray et al. In that patent the virtual processor occupies six time slots as opposed to the virtual processors disclosed herein which have variable time slots. The virtual processors as disclosed take instructions from the central memory and operate upon these instructions. The virtual processors include program counters and a time shared arithmetic unit in the peripheral processing unit. The virtual processors execute programs under instruction control.

The PPU 11 operates upon the program contained in memory and executed by virtual processors in a most efficient manner and additionally provide monitoring controls to programs being run in the CPU 10.

CPU 10 is connected to memory stacks 12—15 through the memory control 18 via a bus 33. The CPU 10 may utilize all eight words in a word block provided from the memory stacks 12—15. Additionally, the CPU 10 has the capability of reading or writing any combination of those eight words. Bus 33 handles three words every 50 nanoseconds, two words input to the CPU 10 and one word output to the memory control 18.

A bus 34 is provided from the memory control 18 to be utilized when the capabilities of the computer system are to be enlarged by the addition of other processing units and the like.

Each of the buses 29, 32, 33 and 34 is independently gated to each memory module, thereby allowing memory cycles to be overlapped to increase processing speed. A fixed priority preferably is established in the memory controls to service conflicting requests from the various units connected to the memory control 18. The internal memory control 18 is given the highest priority, with the external buses 29, 32, 33 and 34 being serviced in that order. The external bus-processor connectors are identical, allowing the processors to be arranged in any other priority order desired.

Figure 3:
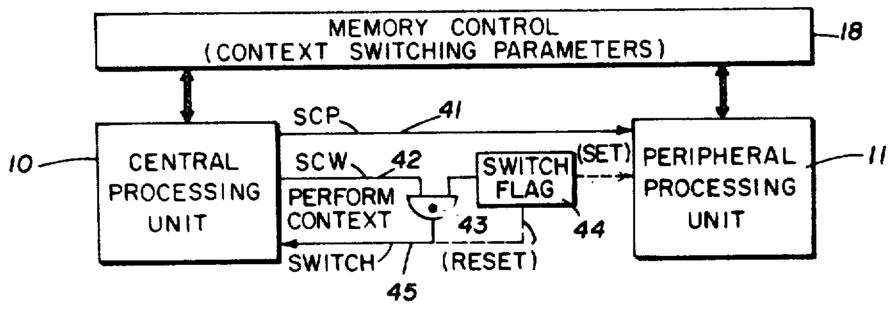
FIG. 3 is a block diagram which illustrates context switching between the central processor unit and the peripheral processor unit of FIGS. 1 and 2.

FIG. 3 illustrates in block diagram, the interface circuitry between the PPU 11 and the CPU 10 to provide automatic context switching of the CPU while "looking ahead" in time in order to eliminate time consuming dialog between the PPU 11 and CPU 10. In operation, the CPU 10 executes user programs on a multiprogram basis. The PPU 11 services requests by the programs being executed by the CPU 10 for input and output services. The PPU 11 also schedules the sequence of user programs operated upon by the CPU 10.

More particularly, the user programs being executed within the CPU 10 requests I/O service from the PPU 11 by either a "system call and proceed" (SCP) command or a "system call and wait" (SCW) command. The user program within the CPU 10 issues one of these commands by executing an instruction which corresponds to the call. The SCP command is issued by a user program when it is possible for the user program to proceed without waiting for the I/O service to be provided but while it proceeds, the PPU 11 can secure or arrange new data or a new program which will be required by the CPU in future operations. The PPU 11 then provides the I/O service in due course to the CPU 10 for use by the user program. The SCP command is applied by way of the signal path 41 to the PPU 11.

The SCW command is issued by a user program within the CPU 10 when it is not possible for the program to proceed without the provision of the I/O service from the PPU 11. This command is issued via line 42. The PPU 11 constantly analyzes the programs contained within the CPU 10 not currently being executed to determine which of these programs is to be executed next by the CPU 10. After the next program has been selected, the switch flag 44 is set. When the program currently being executed by the CPU 10 reaches a state wherein SCW request is issued by the CPU 10, the SCW command is applied to line 42 to apply a perform context switch signal on line 45.

More particularly, a switch flag unit 44 will have enabled the switch 43 so that an indication of the next program to be executed is automatically fed via line 45 to the CPU 10. This enables the next program or program segment to be automatically picked up and executed by the CPU 10 without delay generally experienced by interrogation by the PPU 11 and a subsequent answer by the PPU 11 to the CPU 10. If, for some reason, the PPU 11 has not yet provided the next program description, the switch flag 44 will not have been set and the context switch would be inhibited. In this event, the user program within the CPU 10 that issued the SCW call would still be in the user processor but would be in an inactive state waiting for the context switching to occur. When context switching does occur, the switch flag 44 will reset.

The look ahead capability provided by the PPU 11 regarding the user program within the CPU 10 not currently being executed enables context switching to be automatically performed without any requirement for dialog between the CPU 10 and the PPU 11. The overhead for the CPU 10 is dramatically reduced by this means, eliminating the usual computer dialog.

Figure 4:
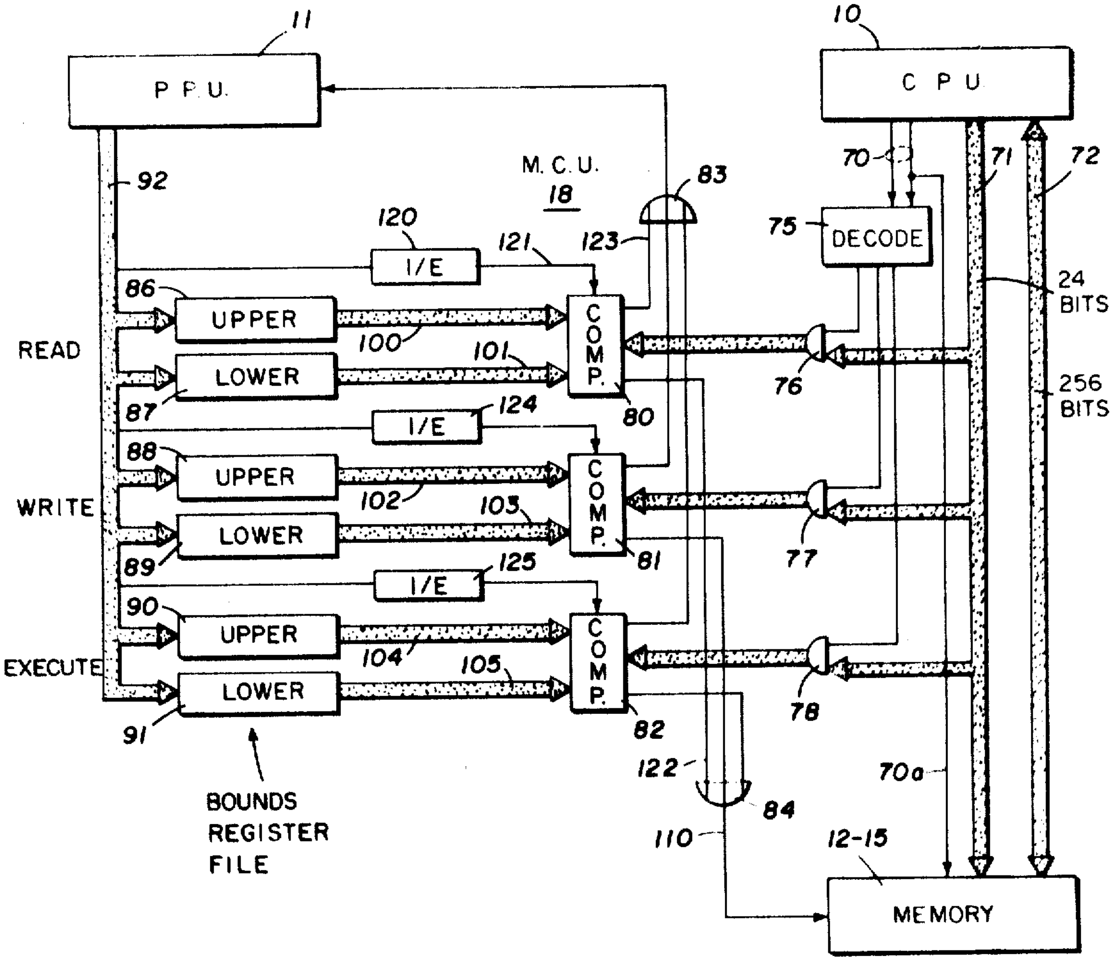
FIG. 4 is a more detailed diagram representing the memory control unit.

Having indicated context switching arrangement between the central processing unit 10 and the peripheral processing unit 11 in a general way, reference should now be had to the description of FIG. 4 in said application, Ser. No. 744,190 filed Jul. 11, 1968, wherein a more detailed circuit has been illustrated to show further details of the context switching control arrangement.

In accordance with the present invention, the memory protection through use of the memory control unit 18 is provided as illustrated in FIG. 4. The memory control unit 18 includes comparison logic, FIG. 4, for control of memory requests from the CPU 10 to memory stacks 12—15.

The memory request may comprise a word having a first group of bits to identify the request, either a read, write or an execute only request.

A second group of bits specifies the address in memory.

A third group of bits may be in the form of data supplied to or from memory.

In the example herein, the ID code is a 2-bit code which is applied from the CPU 10 to memory stacks 12—15 by way of channel 70. The address bits, 24 bits, are applied by way of channels 71. A 256 bit data channel 72 is provided also. Channels 70—72 are illustrated in a functional sense.

The 2-bit ID code is applied to a decode unit 75. In the form illustrated, the channel 70 comprises two lines. One line, the line 70*a*, extends to the memory unit 12—15. By this means, the signal is applied over line 70*a* to memory which is of one character for read and execute only requests. More particularly, if the code is as shown in table I, it will be seen that a one state will appear on line 70*a* for read and execute commands and a zero state will appear on line 70*a* for write commands so that different categories of requests are signalled to memory in addition to the application of a memory cycle enable signal as will now be explained.

TABLE I

| | | |
|---|---|---|
| Read | 0 | 1 |
| Write | 1 | 0 |
| Execute | 1 | 1 |
| | | └→Line 70a |

The output of unit 75 is applied to AND gates 76, 77 and 78. One input of each of AND gates 76—78 is connected to channels 71. Thus, any time there is a memory request, all three of the AND gates would be enabled by the bit on channel 71. Only one of the AND gates 76—78 is active at any one time because only one of the lines in the decode unit 75 will be energized. More particularly, AND gates 76—78 are connected to comparison logic units 80, 81 and 82, respectively. The logic units are all connected in output channels to an OR gate 83 which leads to the PPU 11 to indicate any denial of a memory request. The outputs are also connected to OR gate 84 to enable a memory cycle to be completed.

The memory cycle is enabled by use of three pairs of bound registers, i.e., registers 86, 87, 88, 89, 90 and 91. Each bounds register is connected by way of channels 92 to the PPU so that the PPU can load into registers 86 and 87 the upper and lower bounds for memory addresses for data that are to be read from memory in response to a user program. Similarly, upper and lower bounds are stored in registers 88 and 89 to protect those areas of memory in which data are to be written.

Bounds registers 90 and 91 serve to store upper and lower bounds of instructions that are to be executed only.

Register 86 is connected to logic 80 by way of channel 100. Similarly, channels 101—105 connect registers 87, 88, 89, 90 and 91 to comparison logic units 81 and 82 as shown in FIG. 4.

The comparison logic 80, 81 and 82 compares any address on channels 71 with the addresses stored in the upper and lower bounds registers. If the comparison is positive then a memory cycle is enabled by the application of a memory cycle enable signal on channel 110, by way of OR gate 84. One of channels 92 is connected to comparison logic 80 by way of an I/E bit unit 120. By way of example, if the address on channels 71 is within the bounds stored in registers 86 and 87 (AND gate 76 being enabled) and if there is a zero state on line 121, then the output on line 122 will be at the one state and a memory cycle will be permitted. There will be a zero state on line 121. Thus, an internal bounds comparison is dictated by the state on line 121 leading from I/E unit 120.

If an external bounds comparison is to be made, the line 121 may be set at the one state. In this case, if the address on channels 71 is within the bounds stored in registers 86 and 87 the request fails. That is, there will be a zero state on line 122 and a one state on line 123. Only if the requested address is external to the bounds will the line 122 be in the one state.

In a similar manner, the character of the comparison of requested addresses with bounds stored in register pair 88 and 89, and in register pair 90 and 91, are controlled by I/E unit 124 and 125 respectively.

In each case, the memory protect parameters are loaded into registers 86—91 and units 120, 124 and 125, by the PPU 11. Since words are stored in memory in groups (eight words of 32 bits each in the example here given), memory protection to the octet level is provided for read, write, and execute only requests made to memory by CPU 10 under control of a user program.

Having described the invention in connection with certain specific embodiments thereof, it is to be understood that further modifications may now suggest themselves to those skilled in the art and it is intended to cover such modifications as fall within the scope of the appended claims.

We claim:

1. Processor means including a memory to provide memory bounds protection for data to be read, data to be written and instructions to be fetched for execution from a memory which comprises:
   a. an upper bounds and lower bounds register pair to store upper and lower memory addresses for each of read, write and execute memory storage addresses;
   b. a source of memory request words including ID code bits, memory address bits and accommodation for data bits;
   c. bounds comparators, one connected to each said pair of bounds registers for comparing said memory address bits with the upper and lower memory addresses of the connected upper and lower bounds register pair;
   d. decode logic responsive to said ID code bits to select one of said bounds comparators; and
   e. means responsive to the selected bound comparator to apply an enable bit to said memory if said memory address bits satisfy the selected comparator.

2. The combination of claim 1 wherein peripheral processor means are provided to vary the response of each said comparator means from internal to external bounds comparison.

3. A memory protect system for a computer having a CPU which transmits requests for access to memory by way of a memory control unit in the form of a word having memory access code bits, memory address bits and data bits, comprising:
   a. bounds registers adapted to store upper and lower memory address bounds therein;
   b. a comparator means for response to the stored bounds addresses in said registers;
   c. means responsive to said memory access code bits for allowing said memory address bits to be applied to said comparator means for comparison with the upper and lower address bounds specified by said memory access code bits; and
   d. means responsive to a predetermined bounds comparison in said comparator to enable an access to said memory at the memory address specified by said memory address bits.

4. The combination of claim 3 wherein means are provided to vary the response of said comparator from internal to external bounds comparison.

5. The combination set forth in claim 3 wherein there are three pairs of bounds registers in which read data address bounds, write date address bounds, and execute address bounds are stored, corresponding comparators are provided, and means are provided for providing first access code bits for a read access to memory, second access code bits for a write access to memory, and third access code bits for an execute access to memory.

6. The method of memory protection controlling access to memory of read, write, and execute memory requests, which comprises:
   a. storing in memory predetermined data;
   b. generating memory access code bits;
   c. storing separately from said memory, upper bounds and lower bounds for each of read, write and execute memory storage addresses;
   d. generating signals representative of requests of particular addresses in memory;
   e. comparing the requested addresses with said bounds addresses specified by said memory access code bits; and
   f. enabling said memory to respond to said request, if said comparison satisfies said upper and lower stored bounds specified by said memory access bits.

7. A memory protect system for a computer having a CPU which transmits requests to memory by way of a memory control unit in the form of a word having ID code bits, address bits and data bits, comprising:
   a. peripheral processor means and bounds registers responsive to said peripheral processor means adapted to store upper and lower memory address bounds therein;
   b. comparator means for response to the stored bounds addresses in said registers;
   c. decode means having three output channels responsive to said ID code bits;
   d. AND gates, one connected to each of said output channels and all connected to receive said address bits to apply said address bits to said comparator means for comparison with upper and lower address bounds specified by said ID code bits;
   e. means responsive to a bounds comparison to enable a memory cycle including said address bits; and
   f. means for varying the response of said comparison means from an internal to an external bounds comparison.

8. The combination set forth in claim 7 wherein each said comparator applies a signal indicating the denial of a memory request to said peripheral processor when any bounds comparison fails.